United States Patent
Ruehle et al.

(10) Patent No.: US 9,624,990 B2
(45) Date of Patent: Apr. 18, 2017

(54) ACTUATOR ARRANGEMENT FOR A MOTOR VEHICLE DRIVE TRAIN

(71) Applicant: GETRAG Getriebe- und Zahnradfabrik Hermann Hagenmayer GmbH & Cie KG, Untergruppenbach (DE)

(72) Inventors: Guenter Ruehle, Loechgau (DE); Alexander Kiehlneker, Flein (DE)

(73) Assignee: GETRAG GETRIEBE- UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 785 days.

(21) Appl. No.: 13/893,145

(22) Filed: May 13, 2013

(65) Prior Publication Data

US 2013/0306431 A1    Nov. 21, 2013

(30) Foreign Application Priority Data

May 15, 2012    (DE) .......................... 10 2012 010 172

(51) Int. Cl.
*F16D 48/02* (2006.01)
*F16H 61/688* (2006.01)
(Continued)

(52) U.S. Cl.
CPC ......... *F16D 48/02* (2013.01); *F16D 48/0206* (2013.01); *F16D 63/006* (2013.01);
(Continued)

(58) Field of Classification Search
CPC .............. F16H 63/3483; F16H 63/483; F16H 61/0025; F16H 61/688; F16H 63/3433;
(Continued)

(56) References Cited

U.S. PATENT DOCUMENTS 2,635,427 A * 4/1953 Baugh ...................... B66F 3/46
                                                                    60/475
5,857,381 A * 1/1999 Mentink ................. F15B 7/006
                                                                    60/468
(Continued)

FOREIGN PATENT DOCUMENTS

DE         102 45 369 A1    4/2004
DE    10 2006 022 963 A1    11/2007
(Continued)

OTHER PUBLICATIONS

European Search Report; Application No. EP 13 16 3494; Aug. 21, 2013.

*Primary Examiner* — Terry Chau
(74) *Attorney, Agent, or Firm* — Knobbe Martens Olson & Bear LLP

(57) ABSTRACT

Actuator arrangement for a drive train, which has at least one friction clutch for transmitting drive torque and has a transmission. The friction clutch can be actuated by means of a hydraulic clutch cylinder, which is connected directly to a pump port of a pump driven by an electric motor in order to actuate the friction clutch, such that the friction clutch can be actuated by varying the speed of the pump. The actuator arrangement has a parking lock actuator device for actuating a parking lock arrangement of the drive train. The parking lock actuator device has at least one hydraulic parking lock cylinder, which can be connected to the pump, such that the parking lock arrangement can be actuated by varying at least one of the direction of rotation or the speed of the pump.

7 Claims, 2 Drawing Sheets

(51) Int. Cl.
*F16H 63/34* (2006.01)
*F16D 21/06* (2006.01)
*F16H 63/48* (2006.01)
*F16H 61/00* (2006.01)
*F16D 63/00* (2006.01)
*F16D 121/04* (2012.01)

(52) U.S. Cl.
CPC ....... *F16H 61/0025* (2013.01); *F16H 61/688* (2013.01); *F16H 63/3483* (2013.01); *F16H 63/483* (2013.01); *F16D 2021/0653* (2013.01); *F16D 2048/0236* (2013.01); *F16D 2048/0245* (2013.01); *F16D 2048/0248* (2013.01); *F16D 2048/0287* (2013.01); *F16D 2121/04* (2013.01); *F16H 63/3433* (2013.01); *F16H 63/3466* (2013.01)

(58) Field of Classification Search
CPC ............ F16H 63/3466; F16H 63/3416; F16H 63/3425; F16D 48/02; F16D 48/0206; F16D 63/006; F16D 2021/0653; F16D 2048/0236; F16D 2048/0245; F16D 2048/0248; F16D 2048/0287; F16D 2121/04; B60T 1/005
USPC ..................................................... 192/219.5
See application file for complete search history.

(56) References Cited

U.S. PATENT DOCUMENTS

| | | | | |
|---|---|---|---|---|
| 7,832,540 | B2* | 11/2010 | Quehenberger | .... F16D 25/0638 192/85.31 |
| 9,273,736 | B2* | 3/2016 | Rothvoss | .............. F15B 15/1447 |
| 9,476,431 | B2* | 10/2016 | Heubner | ................ F15B 11/122 |
| 2006/0157316 | A1* | 7/2006 | Okanishi | ................ B63H 23/08 192/221 |
| 2007/0283735 | A1 | 12/2007 | Schweiher et al. | |
| 2008/0149408 | A1 | 6/2008 | Nett et al. | |
| 2008/0190729 | A1* | 8/2008 | Stehr | .................. F16D 48/0206 192/48.601 |
| 2009/0032360 | A1 | 2/2009 | Asano | |
| 2011/0021301 | A1 | 1/2011 | Asano et al. | |
| 2011/0284337 | A1* | 11/2011 | Gassmann | ............. B60K 17/35 192/48.601 |
| 2014/0033844 | A1* | 2/2014 | Rothvoss | .................. F16H 3/16 74/335 |
| 2014/0041986 | A1* | 2/2014 | Ruehle | ................ F16H 63/3416 192/220.2 |

FOREIGN PATENT DOCUMENTS

| | | |
|---|---|---|
| DE | 10 2006 061 516 A1 | 6/2008 |
| DE | 10 2008 011898 A1 | 9/2009 |
| DE | 10 2009 005 410 A1 | 7/2010 |
| DE | 10 2009 018975 A1 | 10/2010 |
| EP | 1 236 918 B1 | 10/2003 |
| WO | WO 2006/002450 A1 | 1/2006 |

* cited by examiner

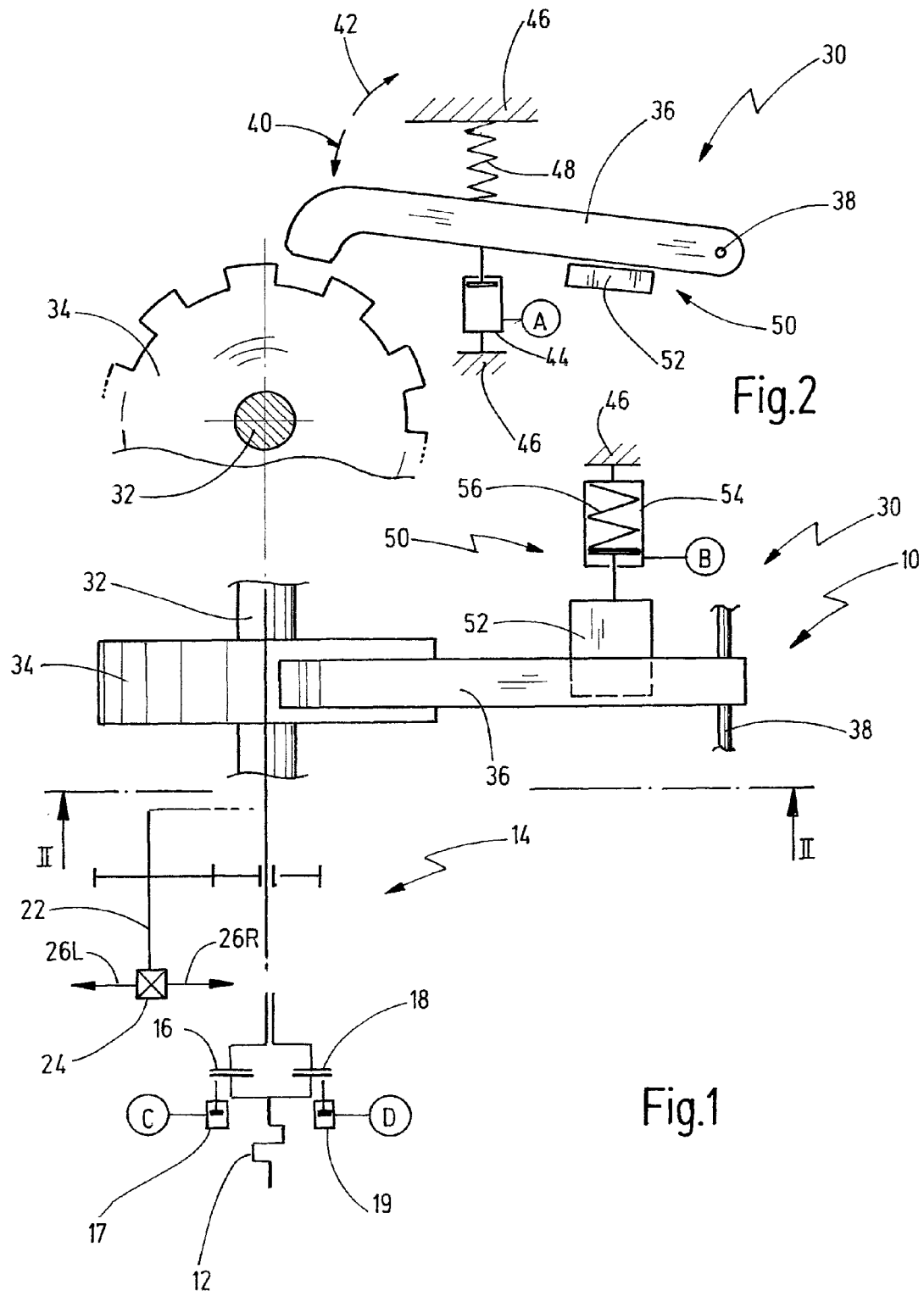

ACTUATOR ARRANGEMENT FOR A MOTOR VEHICLE DRIVE TRAIN

CROSS-REFERENCE TO RELATED APPLICATIONS

This application claims the priority of German patent application DE 10 2012 010 172 filed May 15, 2012.

BACKGROUND OF THE INVENTION

The present invention relates to an actuator arrangement for a drive train, in particular a motor vehicle drive train, which has at least one friction clutch for transmitting drive torque and has a transmission, in particular a step-change transmission, wherein the friction clutch can be actuated by means of a hydraulic clutch cylinder, which is connected directly to a pump port of a pump driven by electric motor in order to actuate the friction clutch, such that the friction clutch can be actuated by varying the speed of the pump, and having a parking lock actuator device for actuating a parking lock arrangement of the drive train.

The present invention furthermore relates to a drive train having a friction clutch, a parking lock arrangement and an actuator arrangement of the abovementioned type.

Drive trains of this kind are known, for example, in the form of automatic shift transmissions or in the form of double-clutch transmissions and converter-type automatic transmissions. In this kind of automated drive train, operating elements of the drive train are actuated in an automated manner by means of suitable actuator arrangements, which can be of a hydraulic, pneumatic, electric-motor or electromagnetic kind, for example.

Hydraulic actuator arrangements of this kind are generally constructed in such a way that a pressure control valve is connected to the pressure output of a pump, by means of which valve a substantially constant line pressure is produced on the delivery side of the pump. Actuating pressures for the individual operating elements are then derived from said line pressure by means of further pressure control valves and/or directional control valves. In this case, the pump is often coupled to a drive motor of the drive train.

EP 1 236 918 B1, which defines the type in question, discloses an actuator arrangement for a wet multiplate clutch in which a pressure port of a pump driven by an electric motor is connected directly, i.e. without interposition of a pressure control valve, to a port of a hydraulic cylinder for actuating the friction clutch. In this kind of actuator arrangement, the pressure in the hydraulic cylinder and hence the actuating force or actuating travel of the friction clutch is controlled by means of the speed of the pump. On the one hand, actuator arrangements of this kind have the advantage that the pump and the electric motor can be arranged remote from the hydraulic cylinder, giving potential advantages in terms of installation space. Moreover, it is possible by means of an actuator arrangement of this kind to produce a similar control quality to that in the hydraulic circuits described at the outset, in which a line pressure is initially produced. Finally, it is advantageous that the actuator arrangement can be operated independently of the operating state of the drive motor (internal combustion engine). This kind of actuator arrangement is therefore also suitable, in particular, for hybrid drive trains or electric vehicles.

In automated vehicle transmissions, a "standstill management system" is generally required. For this purpose, conventional vehicles with manual transmission have a handbrake, which is obligatory in all vehicles. In the case of vehicles with manual transmission, the vehicle can furthermore hold itself if a gear is selected since the clutch between the transmission and the internal combustion engine is normally closed. Converter-type automatic transmissions always have an additional parking lock. In automated shift transmissions or double-clutch transmissions too, especially if the friction clutch(es) is (are) normally open, a parking lock is generally required. The parking lock can be actuated purely mechanically by the driver via an operating element (P position of the gear lever). It is furthermore possible for the parking lock to be actuated by pushbutton (park by wire) or automatically when the engine stops. In the latter case, a corresponding actuating mechanism is required in the transmission for the actuation of the parking lock.

A parking lock arrangement which is actuated by hydraulic cylinders is known from DE 10 2006 022 963 A1, for example. Where conventional hydraulic circuits, in which a pump driven by an internal combustion engine produces a line pressure, are used, however, it is not possible to guarantee the actuation of such a parking lock arrangement under all operating conditions.

BRIEF SUMMARY OF THE INVENTION

It is therefore the object of the invention to indicate an improved actuator arrangement and an improved drive train in which a parking lock arrangement can be actuated in all operating conditions and which is of simple construction.

This object is achieved in the case of the actuator arrangement mentioned at the outset by virtue of the fact that the parking lock actuator device has at least one hydraulic parking lock cylinder, which can be connected to the pump, such that the parking lock arrangement can be actuated by varying the direction of rotation and/or the speed of the pump.

The above object is furthermore achieved by a drive train having a friction clutch, a parking lock arrangement and an actuator arrangement of the type according to the invention.

In the actuator arrangement according to the invention, a friction clutch is actuated by means of a hydraulic clutch cylinder connected directly to a pump driven by electric motor. By connecting a hydraulic parking lock cylinder to the pump, it is also possible to actuate the parking lock arrangement by varying the direction of rotation and/or the speed of the pump.

Consequently, the parking lock actuator device can be implemented with a small number of components.

Moreover, actuation of the parking lock arrangement is possible even when a drive motor, such as an internal combustion engine, is not running.

The fact that both the friction clutch and the parking lock arrangement can be actuated by means of just one single pump and one single electric motor results in significant advantages in terms of installation space. Since the pump and the electric motor can be arranged in spatially separate locations from the hydraulic clutch cylinder and the hydraulic parking lock cylinder, integration both into existing transmission designs and into spatially restricted transmission designs is possible.

Moreover, the same control unit can be used to activate the electric motor.

Overall, it is possible in this way to implement a "park by wire" system in a manner which is simple in terms of design.

Thus, the object is fully achieved.

In general terms, it is possible for the pump to be designed as a unidirectional pump and for the delivery or pressure port of the pump to be connected either to the hydraulic clutch cylinder or to the hydraulic parking lock cylinder via a simple valve arrangement.

However, it is particularly advantageous if the pump is designed as a bidirectional pump with a first and a second pump port, wherein the hydraulic clutch cylinder is connected to the first pump port and wherein the hydraulic parking lock cylinder is connected to the second pump port.

In this embodiment, both the first and the second pump port can be designed as the delivery port, depending on the direction of rotation of the pump. In this embodiment, the friction clutch is actuated in one direction of rotation and the parking lock arrangement is actuated in the other direction of rotation.

Since the friction clutch and the parking lock do not generally have to be actuated simultaneously, there is no functional disadvantage associated with this embodiment.

In general terms, it is possible here to assign one direction of rotation of the pump exclusively to the actuation of the friction clutch and the other direction of rotation exclusively to the actuation of the parking lock arrangement.

However, it can be advantageous if the second direction of rotation is also used to actuate the friction clutch rapidly in the opposite direction. This can be advantageous especially when there is a need to open the friction clutch rapidly (in the case of a "normally open" friction clutch, which is preferably provided), especially in the case of a reset of a control unit for the drive train. In the case of such a reset, the pump is preferably actively driven for a brief period in the opposite direction of rotation in order to open the friction clutch as quickly as possible.

In the case of a double-clutch transmission having two friction clutches, it is thereby possible to cancel out as quickly as possible a state of strain, in which the two friction clutches of the two transmission sections are closed simultaneously even though a gear ratio has been selected in each of the transmission sections.

A particularly preferred option with this embodiment is one in which an elastically preloaded hydraulic accumulator is connected to a connection between the second pump port and the hydraulic parking lock cylinder.

When the pump is activated briefly in the second direction of rotation in order to open the friction clutch as quickly as possible, the volume flow of hydraulic fluid which flows in the direction of the hydraulic parking lock cylinder as a result is initially absorbed in the hydraulic accumulator. As a result, unwanted actuation of the hydraulic parking lock cylinder is avoided. Only if the pump is operated in the second direction of rotation until the hydraulic accumulator is full is the hydraulic parking lock cylinder assigned to the second pump port filled in order to actuate the parking lock arrangement.

It is furthermore preferred overall if a connection between a pump port and the hydraulic clutch cylinder and/or a connection between the pump port and the hydraulic parking lock cylinder is connected to a low-pressure region, such as a tank, via an orifice or a restrictor of fixed cross section.

The provision of such an orifice ensures that, when hydraulic fluid is fed to the respective hydraulic cylinder, a leakage volume flow is set up via the orifice. It is thereby possible to improve controllability. In this case, a pressure sensor can preferably be provided at the connection between the pump port and the respective hydraulic cylinder in order in this way to measure the actual pressure and control it via a suitable algorithm in the control unit.

It is furthermore advantageous overall if a connection between a pump port and the hydraulic clutch cylinder and/or a connection between the pump port and the hydraulic parking lock cylinder is connected to a low-pressure region via a suction valve.

In this embodiment, it is possible to ensure that the pump always delivers hydraulic fluid and does not draw in air when the direction of rotation changes. In this case, it is preferable if return lines to the low-pressure region are arranged in such a way structurally that the return is below the fluid level in a fluid sump of the drive train.

In this case, the suction valve can be implemented as a simple nonreturn valve with a very low spring preload.

Since a nonreturn valve does not require higher standards of cleanliness during manufacture and assembly, the actuator arrangement can furthermore be manufactured easily. In particular, it is preferable if no slide valves are provided in the actuator arrangement according to the invention, these entailing higher standards of cleanliness during manufacture and assembly.

The friction clutch of the drive train can be a single friction clutch, e.g. that of an automated shift transmission or of a converter-type automatic transmission.

However, it is particularly advantageous if the actuator arrangement has a first hydraulic clutch cylinder for actuating a first friction clutch of the drive train, a second hydraulic clutch cylinder for actuating a second friction clutch of the drive train, a first pump, which is connected directly to the first hydraulic clutch cylinder, and a second pump, which is connected directly to the second hydraulic clutch cylinder.

An actuator arrangement of this kind is suitable, in particular, for actuating a double-clutch arrangement of a double-clutch transmission. Here, the first friction clutch connects a drive motor to a first transmission section, and the second friction clutch connects the drive motor to a second transmission section. Since the friction clutches can be activated independently of one another by the respectively dedicated pumps, the friction clutches can be actuated in an overlapping manner in order to perform gear changes without interruption in tractive effort.

In a drive train of this kind, it is generally possible to configure only one of the two pumps for the actuation of the parking lock arrangement.

However, it is particularly advantageous if the parking lock actuator device has a first hydraulic parking lock cylinder for opening or closing the parking lock arrangement and a second hydraulic parking lock cylinder for locking or unlocking the parking lock arrangement in the open or in the closed position.

In parking lock arrangements of the type described above, the first hydraulic parking lock cylinder serves to open the parking lock arrangement (e.g. by lifting a pawl out of toothing of a parking lock wheel) or to close it. In this case, the first hydraulic parking lock cylinder is preferably a single-acting hydraulic cylinder, and therefore a spring pushes the parking lock arrangement either in the closing direction or in the opening direction. It is particularly preferred if the first hydraulic parking lock cylinder is used to open the parking lock arrangement, that is to say acts counter to a spring acting in the closing direction.

The second hydraulic parking lock cylinder is used to lock or unlock the parking lock arrangement. This can be locking in the closed position but is preferably locking in the open position. The locking device can be used to relieve the load on the first hydraulic parking lock cylinder. The second hydraulic parking lock cylinder is preferably likewise a single-acting hydraulic cylinder, which is pushed in the locking direction by means of a spring, and therefore the locking device is self-locking. In the locking position, the parking lock arrangement can be closed but is preferably open, especially if the first hydraulic parking lock cylinder is used to open the parking lock arrangement. Consequently, the second hydraulic parking lock cylinder is preferably used to unlock the parking lock arrangement.

A particularly preferred option in the abovementioned embodiment is one in which the first hydraulic parking lock cylinder is connected to the first or the second pump and in which the second hydraulic parking lock cylinder is connected to the other pump.

In this embodiment, which is designed especially for a double-clutch transmission, the first pump assigned to one friction clutch, said first pump being driven by a first electric motor, is assigned to the first hydraulic parking lock cylinder, and the second pump, which is assigned to the second friction clutch and is driven by a second electric motor, is assigned to the second hydraulic parking lock cylinder.

In this way, it is possible to implement even a complex parking lock arrangement with two hydraulic parking lock cylinders without significant additional outlay.

In the actuator arrangement according to the invention, the parking lock arrangement can be actuated automatically or by pushbutton. In this case, the parking lock arrangement can be actuated independently of a drive motor, such as an internal combustion engine. An additional electric actuating system is not required for the parking lock arrangement. In particular, the actuating system and electric control system already present in the drive train can be used.

It goes without saying that the features mentioned above and those which will be explained below can be used not only in the respectively indicated combination but also in other combinations or in isolation without exceeding the scope of the present invention.

BRIEF DESCRIPTION OF THE SEVERAL VIEWS OF THE DRAWING

Illustrative embodiments of the invention are shown in the drawing and are explained in greater detail in the following description. In the drawing:

FIG. 1 shows a schematic representation of a drive train according to the invention comprising a schematic plan view of a parking lock arrangement;

FIG. 2 shows a schematic sectional view along the line II-II in FIG. 1;

DETAILED DESCRIPTION OF THE INVENTION

Figure 3:
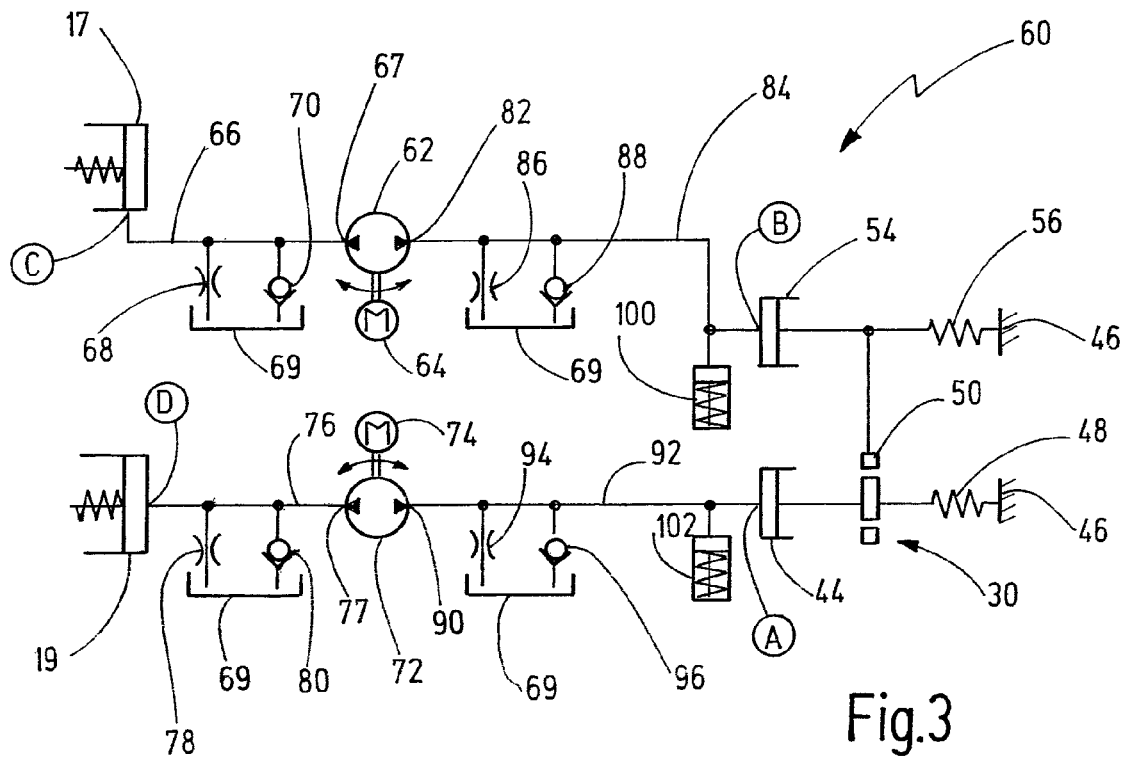
FIG. 3 shows an actuator arrangement for the drive train in FIGS. 1 and 2.

In FIGS. 1 and 2, a drive train for a motor vehicle, in particular a passenger vehicle, is illustrated schematically and denoted overall by 10. The drive train 10 has a drive motor 12, such as an internal combustion engine, and a transmission 14, which is preferably designed as a step-change transmission in the form of a layshaft transmission. In the present case, the transmission 14 is formed by two transmission sections of a double-clutch transmission, although only a single gearset is illustrated schematically in FIG. 1.

The drive train 10 furthermore contains a first friction clutch 16, which can be actuated by means of a first hydraulic clutch cylinder 17. The first hydraulic clutch cylinder 17 has a single cylinder port C. The double-clutch transmission furthermore contains a second friction clutch 18, which can be actuated by means of a second hydraulic clutch cylinder 19, which is likewise designed as a single-acting hydraulic cylinder with a single cylinder port D.

The two friction clutches 16, 18 are preferably designed as normally open friction clutches, e.g. in the form of wet multiplate clutches. However, the friction clutches 16, 18 can also be designed as normally closed and/or as dry friction clutches. Input elements of the two friction clutches 16, 18 are connected to the drive motor 12. Each of the friction clutches 16, 18 is connected to a respective input shaft of the double-clutch transmission 14, and these can be arranged concentrically with one another, for example. The transmission 14 has a transmission output shaft 22, which is connected to a differential 24 which distributes the motive power to two driven wheels 26L, 26R of the motor vehicle.

The drive train 10 furthermore has a parking lock arrangement 30, which is assigned to the transmission 14 for example. The parking lock arrangement 30 contains a shaft 32, which can form a shaft of the transmission 14, for example, either a transmission input shaft or, preferably (as indicated in broken lines), the transmission output shaft 22 or a shaft rigidly coupled thereto.

Fixed on the shaft 32 is a parking lock wheel 34, which, as illustrated in FIG. 2, has parking lock toothing on the outer circumference thereof. The parking lock arrangement 30 furthermore contains a parking lock pawl 36, which is pivotably mounted on a pawl shaft 38. For this purpose, the parking lock pawl 36 can be actuated in a closing direction 40 in order to close the parking lock arrangement 30, the parking lock pawl engaging in the toothing of the parking lock wheel 34. In the opposite, opening direction 42, the parking lock pawl 36 and the parking lock wheel 34 are decoupled from one another in order to open the parking lock arrangement 30.

As shown, in particular, in FIG. 2, the parking lock arrangement 30 has a first hydraulic parking lock cylinder 44, which is designed as a single-acting cylinder with a single cylinder port A. The hydraulic parking lock cylinder 44 is supported on a housing 46 of the drive train 10, in particular of the double-clutch transmission 14. The parking lock arrangement furthermore contains a first parking lock spring 48, which is likewise supported on the housing 46 and pushes the parking lock pawl 36 in the closing direction 40. In this case, the first hydraulic parking lock cylinder 44 is designed as an opening cylinder for moving the parking lock pawl 36 in the opening direction 42, counter to the force of the first parking lock spring 48.

As shown, in particular, in FIG. 1, the parking lock arrangement 30 furthermore contains a locking device 50. The locking device 50 has a catch 52, which, in a locking position, shown in FIG. 1, engages behind the parking lock pawl 36 in the open position, and therefore the first hydraulic parking lock cylinder 44 does not have to be continuously activated in order to hold the parking lock arrangement 30 open.

The locking device 50 furthermore contains a second hydraulic parking lock cylinder 54, which is designed as a single-acting cylinder with a single cylinder port B. The locking device 50 furthermore has a second parking lock spring 56, which is supported on the housing 46 and pushes the catch 52 into the locking position shown in FIG. 1. In this case, the second hydraulic parking lock cylinder 54 is designed as an unlocking cylinder and acts counter to the force of the second parking lock spring 56. As shown by the example of the second hydraulic parking lock cylinder 54, the springs 48, 56 can be integrated into the respective cylinders but can also be designed as separate spring elements, as shown by way of example for the first parking lock spring 48.

It goes without saying that the transmission 14 preferably has a plurality of gear ratios, which can be engaged and disengaged by means of selector clutches, for example. It also goes without saying that corresponding actuators are also provided for actuating the selector clutch arrangements.

To engage the parking lock, the locking device 50 is first of all unlocked, for which purpose fluid is fed to the second hydraulic parking lock cylinder 54. The load on the first hydraulic parking lock cylinder 44 is then relieved, if this has not already been done, with the result that the parking lock pawl 36 is pushed in the closing direction 40 by the force of the first parking lock spring 48 in order to establish a positive connection between the parking lock pawl 36 and the parking lock wheel 34. To release the parking lock arrangement 30, the first hydraulic parking lock cylinder 44 is first of all actuated, namely counter to the force of the first parking lock spring 48, in order to move the parking lock pawl 36 in the opening direction 42. The second hydraulic parking lock cylinder 54 is then relieved of load, if this has not already been done, with the result that the catch 52 engages behind the parking lock pawl 36 due to the force of the second parking lock spring 56 and, in this way, holds it in the open position.

In both positions (closed position and open position), the parking lock arrangement 30 is in each case held by the action of the respective springs 48, 56, without a supply of energy.

An actuator arrangement for actuating the friction clutches 16, 18 and the parking lock arrangement 30 of the drive train 10 in FIGS. 1 and 2 is shown in FIG. 3.

The actuator arrangement 60 contains a first pump 62, which is preferably designed as a bidirectional rotary pump and can be operated in both directions of rotation by means of a first electric motor 64.

The first pump 62 has a first pump port 67, which is connected to port C of the first hydraulic clutch cylinder 17 by a first direct connection 66. The first connection 66 is connected via a first orifice 68 to a low-pressure region 69, such as a tank. The first connection 66 is furthermore connected to the low-pressure region 69 via a first suction valve 70 in the form of a simple nonreturn valve.

For actuation of the second friction clutch 18, a second pump 72 is provided, which is likewise designed as a bidirectional rotary pump and can be driven by means of a second electric motor 74.

A further first pump port 77 of the second pump 72 is connected by a further first connection 76 to port D of the second hydraulic clutch cylinder 19. The further first connection 76 is connected via a second orifice 78 to the low-pressure region 69. The further first connection 76 is furthermore connected to the low-pressure region 69 via a second suction valve 80 in the form of a simple nonreturn valve.

The first pump 62 has a second pump port 82, which is connected directly to port B of the second hydraulic parking lock cylinder 54 by a second connection 84. The second connection 84 is connected to the low-pressure region 69 via a third orifice 86 and via a third suction valve 88.

In a corresponding manner, the second pump 72 has a further second pump port 90, which is connected directly to port A of the first hydraulic parking lock cylinder 44 by a further second connection 92. The further second connection 92 is connected to the low-pressure region 69 via a fourth orifice 94 and via a fourth suction valve 96.

The second connection 84 is furthermore connected to a first elastically preloaded hydraulic accumulator 100. In a corresponding manner, the further second connection 92 is connected to a second elastically preloaded hydraulic accumulator 102.

The actuator arrangement 60 operates as follows. The first friction clutch 16 is a normally open friction clutch, for example. When this is supposed to be closed, the first pump 62 is driven by means of the electric motor 64 in such a way that hydraulic fluid is sucked in via the third suction valve 88 and, if appropriate, the third orifice 86 and is fed to the first hydraulic clutch cylinder 17 via the first pump port 67. By varying the speed of the electric motor 64, it is possible to adjust the pressure in the first hydraulic cylinder 17 in order to adjust the friction clutch to a particular operating point. During this process, there is a continuous leakage via the first orifice 68, thus improving the controllability of the pressure. If the first friction clutch 16 is to be opened quickly, the first pump 62 is briefly operated in the opposite direction by means of the electric motor 64, with the result that hydraulic fluid is sucked out of the first hydraulic friction clutch cylinder 17 and discharged via the second pump port 82. In order to avoid a situation where the second hydraulic parking lock cylinder 54 is unintentionally actuated during this process, the hydraulic fluid which is briefly fed into the second direct connection 84 is absorbed in the elastically preloaded first hydraulic accumulator 100.

The second pump 72 for actuating the second friction clutch 18 operates in an identical manner, there being the possibility of activating the two friction clutches 16, 18 independently of one another in order to perform overlapping actuations in the double-clutch transmission 14 for the purpose of carrying out a gear change. If the parking lock is supposed to be engaged after driving, the catch 52 of the locking device 50 is initially below the parking lock pawl 36. In order to engage the parking lock, therefore, the first pump 62 is initially operated in the second direction of rotation, with the result that hydraulic fluid is sucked in via the first suction valve 70 and, if appropriate, the first orifice 68 and fed into the second direct connection 84. There, the first hydraulic accumulator 100 is initially filled until it is completely full (a spring preload of the hydraulic accumulator has a lower spring rate than the parking lock springs). Hydraulic fluid is then fed into the second hydraulic parking lock cylinder 54, by means of which the catch 52 is pushed back counter to the force of the second parking lock spring 56 (upwards or in the direction of the housing 46 in FIG. 1). The first hydraulic parking lock cylinder 44 is not activated and is depressurized via the fourth orifice 94, with the result that the parking lock pawl 36 is then pushed into a recess in the toothing of the parking lock wheel 34 by means of the first parking lock spring 48 in order to close the parking lock arrangement.

To open the parking lock arrangement, the second pump 72 is driven in the second direction of rotation in order to feed hydraulic fluid into the further second connection 92, where initially the second hydraulic accumulator 102 is filled. The first hydraulic parking lock cylinder 44 is then actuated in order to release the parking lock pawl 36 from engagement with the toothing of the parking lock wheel 34 counter to the force of the first parking lock spring 48. As soon as the parking lock pawl 36 has been raised far enough in the opening direction 42, the catch 52 is pushed under the parking lock pawl by means of the second parking lock spring 46, with the second parking lock cylinder 54 being substantially depressurized via the third orifice 86.

In all other operating states, the two pumps 62, 72 can be used to actuate the respective friction clutches 16, 18 as described above.

The above-described embodiment of a drive train 10 with an associated actuator arrangement 60 relates essentially to a double-clutch transmission.

Figure 4:
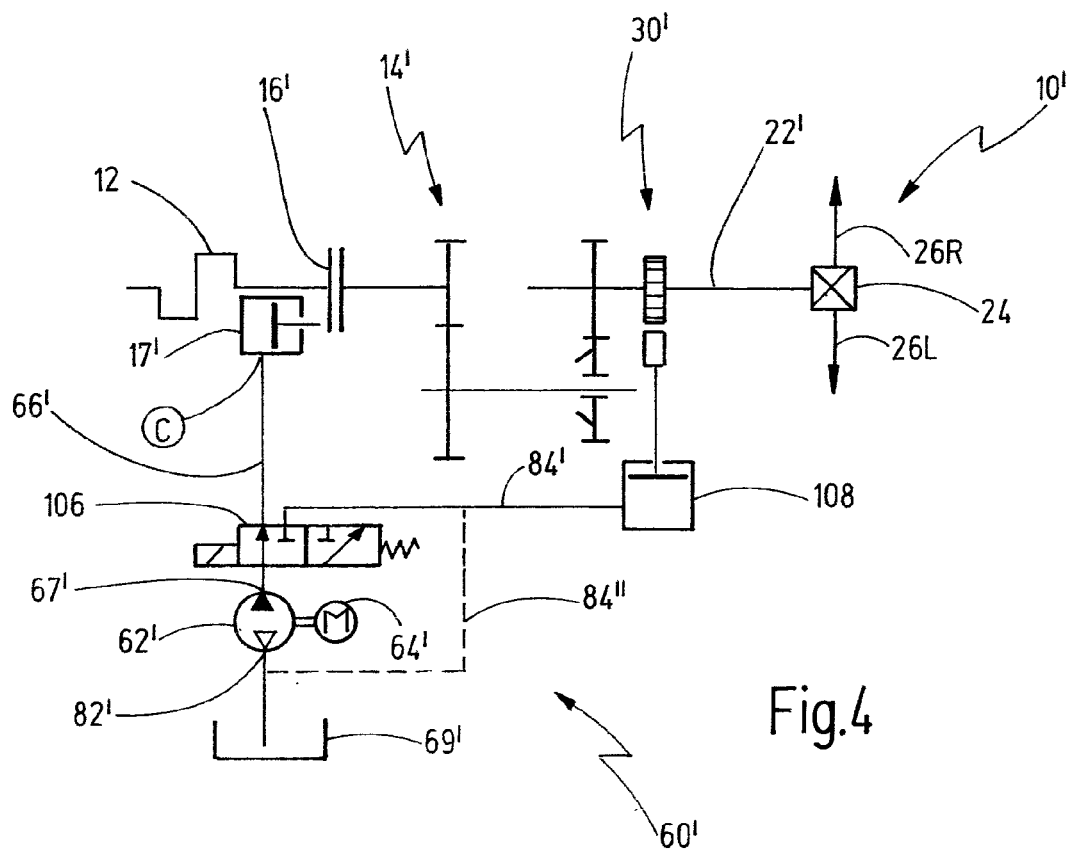
FIG. 4 shows an alternative drive train with an alternative actuator arrangement.

FIG. 4 illustrates a simplified form of a drive train 10' which is constructed as an automated shift transmission with a drive motor, a single friction clutch 16' and a simple step-change transmission 14' of layshaft design, the output shaft 22' of which is connected to a differential 24.

The single friction clutch 16' is actuated by means of a hydraulic clutch cylinder 17' of an actuator arrangement 60', port C of which is connected to the first port 67' of a pump 62' by a directional control valve 106. The other port of the pump is connected to the low-pressure region 69'. In this case, the pump 62' can be designed as a unidirectional pump, as indicated in FIG. 4. It is driven by an electric motor 64'.

The directional control valve 106 is designed as a 3/2-way valve and can be activated by means of at least one solenoid. In the home position shown in FIG. 4, the directional control valve 106 establishes a direct connection between the first port 67' and port C of the hydraulic clutch cylinder 17'.

In a second position of the directional control valve 106, pump port 67' is connected directly, via connection 84', to one port of a single hydraulic parking lock cylinder 108, which actuates a parking lock arrangement 30' on the transmission output shaft 22'.

In this embodiment too, it is possible, instead of using a directional control valve 106, to connect the second pump port 82' directly to the port of the hydraulic parking lock cylinder 108, as indicated in broken lines at 84" in FIG. 4.

In general terms, it is also possible to connect connection 84' to two hydraulic parking lock cylinders via a further directional control valve arrangement, as shown in FIGS. 1 and 2, for example.

Actuator arrangements of the type described above can also be used to actuate a parking lock arrangement of the kind described in DE 10 2006 022 963 A1, for example. The disclosure of this document is incorporated herein by reference. In this parking lock arrangement too, two hydraulic cylinders, which can be activated by means of actuator arrangement 60 or 60', are preferably provided.

What is claimed is:

1. Actuator arrangement comprising:
    an electric motor,
    a pump driven by the electric motor, said pump having a pump port,
    a hydraulic clutch cylinder for actuating a friction clutch of a drive train, the hydraulic clutch being connected directly to the pump port of the pump such that the friction clutch can be actuated by varying the speed of the pump, and
    a parking lock actuator device for actuating a parking lock arrangement of the drive train, wherein the parking lock actuator device has at least one hydraulic parking lock cylinder, which can be connected to the pump, such that the parking lock arrangement can be actuated by varying in at least one of the direction of rotation and the speed of the pump,
    wherein at least one of a connection between the pump port and the hydraulic clutch cylinder and a connection between the pump port and the hydraulic parking lock cylinder is connected to a low-pressure region via a suction valve.

2. Actuator arrangement according to claim 1, wherein the pump is designed as a bidirectional pump with the pump port and a second pump port, wherein the hydraulic clutch cylinder is connected to the pump port and wherein the hydraulic parking lock cylinder is connected to the second pump port.

3. Actuator arrangement according to claim 2, wherein an elastically preloaded hydraulic accumulator is connected to a connection between the second pump port and the hydraulic parking lock cylinder.

4. Actuator arrangement according to claim 1, wherein at least one of the connection between the pump port and the hydraulic clutch cylinder and the connection between the pump port and the hydraulic parking lock cylinder is connected to the low-pressure region via an orifice.

5. Actuator arrangement according to claim 1, wherein the friction clutch is a first friction clutch, wherein the hydraulic clutch cylinder is a first hydraulic clutch cylinder, wherein the pump is a first pump, and wherein the actuator arrangement has the first hydraulic clutch cylinder for actuating the first friction clutch of the drive train, a second hydraulic clutch cylinder for actuating a second friction clutch of the drive train, the first pump, which is connected directly to the first hydraulic clutch cylinder, and a second pump, which is connected directly to the second hydraulic clutch cylinder.

6. Actuator arrangement according to claim 1, wherein the hydraulic parking lock cylinder is a first hydraulic parking lock cylinder, and wherein the parking lock actuator device has the first hydraulic parking lock cylinder for opening or closing the parking lock arrangement and a second hydraulic parking lock cylinder for locking or unlocking the parking lock arrangement in the open or in the closed position.

7. Actuator arrangement according to claim 6, wherein, the friction clutch is a first friction clutch, wherein the hydraulic clutch cylinder is a first hydraulic clutch cylinder, wherein the pump is a first pump and wherein the actuator arrangement has the first hydraulic clutch cylinder for actuating the first friction clutch of the drive train, a second hydraulic clutch cylinder for actuating a second friction clutch of the drive train, the first pump, which is connected directly to the first hydraulic clutch cylinder, and a second pump, which is connected directly to the second hydraulic clutch cylinder, and wherein the first hydraulic parking lock cylinder is connected to the first or to the second pump, wherein the second hydraulic parking lock cylinder is connected to the other pump.

* * * * *